3,310,117
HELICOPTER SPAR HAVING INTEGRAL MASS
AND STIFFNESS CONTROL PROVISIONS
Cornell J. Slivinsky and Stanley Steed, both of Traverse
City, Mich., assignors to Parsons Corporation, Traverse
City, Mich., a corporation of Michigan
Filed Apr. 8, 1966, Ser. No. 541,163
6 Claims. (Cl. 170—159)

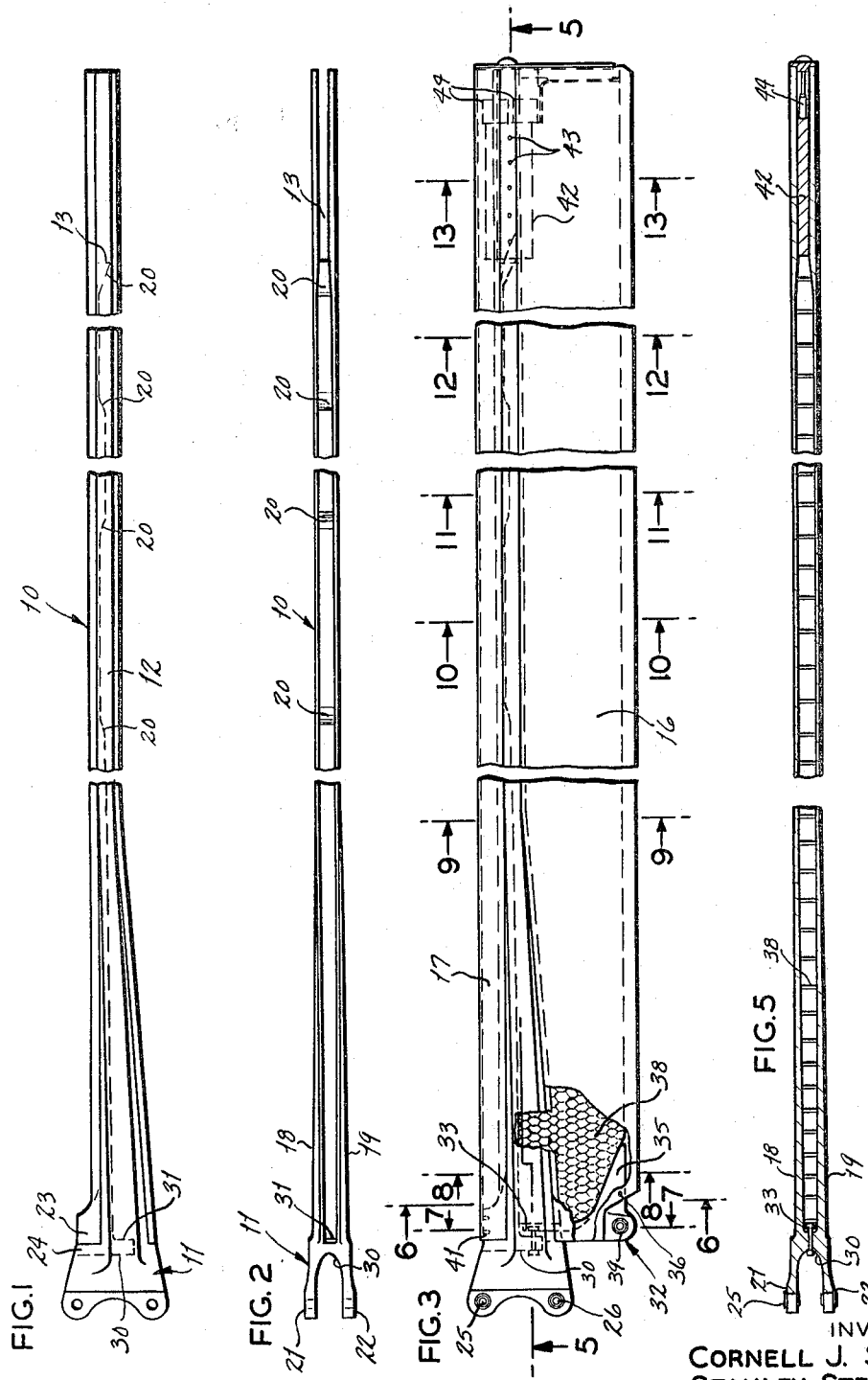

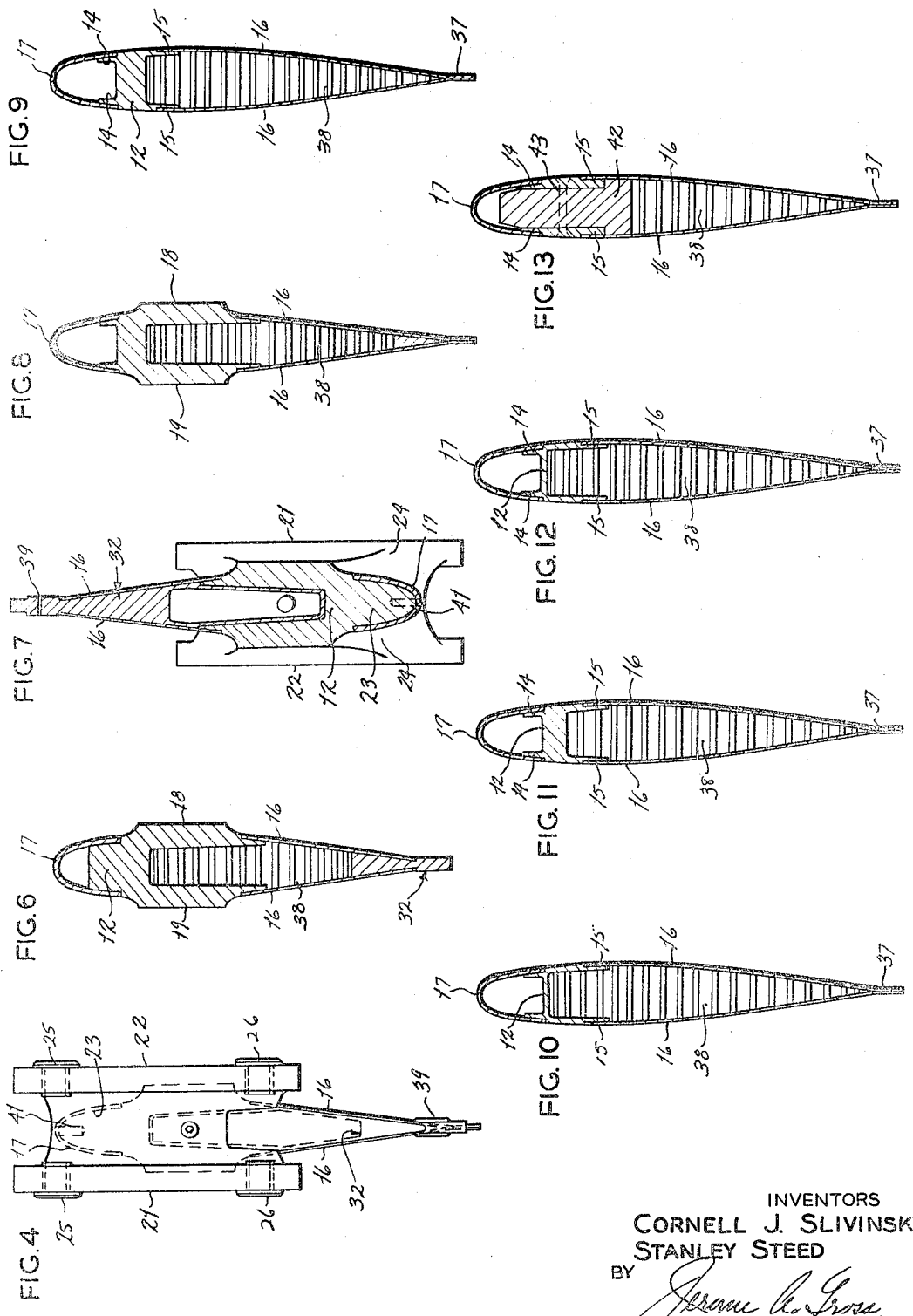

The present invention relates to the construction of helicopter rotor blades and the like using an integral spar as a spine or backbone for the blade, from root to tip.

Many engineering problems must be met in the design of satisfactory helicopter rotor blades and the root-retentions therefor. To make the spar as a shaped beam to support forward skins or aft skins has presented design and manufacturing criteria seemingly inconsistent with the attribute of increasing the spar's mass and stiffness characteristics gradually inboard toward the blade root. More recently recognized is the desirability of ready variation locally, after a basic spar design has been chosen, to achieve locally desirable mass and stiffness characteristics and engineering control of their spanwise distribution.

The objects of the present invention include providing a good basic form of spar, which is readily manufactured and assembled with the remainder of the blade structure to support leading edge and aft structure, give basic airfoil shape, provide for reliable root-retention, but yet whose design may be readily modified to provide spanwise-varying characteristics of mass and stiffness both generally and locally.

These and other objects which will be apparent from this disclosure are achieved generally by providing an integral spine or backbone member which combines the blade contour and skin support provisions of an H-section with milled variations of web thickness, increasing to a root section of great solidity. This basic H-section member has forward and aft extending portions which serve over the greater portion of the blade span as upper and lower skin support flanges, but which are thickened toward the root. The H-section also has a portion which, over the greater portion of the span, extends vertically to connect these skin-support flanges as a shear web, and which is thickened toward the root end and merges into a clevis throat part. These variations in thickness, generally increasing spanwise inboard, are used in detail design to control the mass and stiffness characteristics of the blade. In the preferred embodiment, illustrated, integral clevis fitting plate parts are used, extending inboard from the upper and lower skin support flange portions. An aft closure rib member is secured to the clevis throat part aft of the web portion. Completion of the structure is conventional.

In the accompanying drawings:

FIG. 1 is a plan view of the integral spar and root retention which forms the spine of the helicopter rotor blade hereinafter described.

FIG. 2 is an aft side view thereof.

FIG. 3 is a plan view of a helicopter rotor blade constructed on the spar of FIG. 1, partly broken away at the root end to show internal details.

FIG. 4 is a left end view showing the root and root-retention structure of FIG. 3.

FIG. 5 is a sectional view taken along the offset line 5—5 of FIG. 3.

FIG. 6 is a section taken along line 6—6 of FIG. 3.

FIG. 7 is a sectional view looking inboard along line 7—7 of FIG. 3.

FIGS. 8, 9, 10, 11, 12 and 13 are sections taken along the correspondingly numbered lines of FIG. 3, progressively outboard of section 8.

The integral spar and root-retention member, generally designated 10 and shown in FIGS. 1 and 2, may be preliminarily formed to a blank of rough dimensions, by conventional methods, using a single piece of metal having suitable structural characteristics, for example aluminum of one of the alloys commonly employed for aircraft. Its final dimensions are readily achieved by milling. Along the greater part of the blade span, outboard of the root, it is formed approximately as an H-section beam (see, for example, FIGS. 10, 11 and 12), with a vertical web portion 12 and forward and aft extending portions 14, 15 which serve as upper and lower skin support flanges, hereafter described. Wherever along the span additional mass is required, the section is varied, for example, by increasing the thickness of the web portion. Greater stiffness is similarly achieved, by thickening the skin support flanges. As the root end is approached, all these portions are gradually thickened; the skin support flanges project still farther forward and aft, and are spaced farther from the chord plane; at the root end the section becomes nearly solid, to form a strong clevis juncture or throat part generally designated 11, at which the web portion terminates; while the upper and lower portions may project inboard to form upper and lower plate-like clevis fitting parts 21, 22.

Considering the drawings in greater detail, the integral spine-like member 10 has along the greater part of its length a vertical web portion 12 which in the embodiment shown terminates short of the blade tip end, where it is milled away to provide a weight-receiving slot 13. Its thickness, commencing at the slot 13 and extending inboard, varies from the normally slender web section shown in FIG. 12 to the locally thickened section shown in FIG. 11 (see the tapered steps 20, FIGS. 1 and 2) thence back to the slender web portion of FIG. 10. Such locally thickened web portions are engineered either at the time of original design or by subsequent design revision, to control mass and stiffness characteristics progressively along the blade span. Except for such local thickening, however, the vertical web portion 12 has a thickness variation which characteristically increases gradually inboard toward the clevis juncture 11, which extends solidly from the leading edge chordwise aft to the rearward extent of the thickened web portion 12. Near the root section of the blade, as shown in FIG. 8, the integral spine member 10 may be gradually thickened above and below airfoil contour, and extended chordwise aft as well as forward, to become immediately outboard of the clevis throat 11, a bulky C-section as shown in FIG. 7. From such C-section the transformation to the clevis juncture 11 is made as shown in FIGS. 1, 2 in the sectional view FIG. 6 and the clevis end view FIG. 4; the heavy upper and lower members of the "C" merge, as shown, into the still larger plate-like clevis fitting parts 21, 22; while the bulky center portions of the "C" merges into the throat wall 30 of the clevis juncture 11.

Further details of the integral spine member are best considered together with the remainder of the blade structure, assembled as in FIG. 3. The upper and lower aft skin support flanges 15 are milled along their rearward margins, inwardly from the airfoil contour sufficiently to form recesses to receive the forward margins of fairly light weight upper and lower aft skins 16. The forward projecting skin support flanges 14 are likewise recessed inwardly of the outer surface of the airfoil to receive the aft edges of a relatively heavy curved leading edge plate 17, formed of stainless steel or other suitable material. These skins 16 and plate 17 are adherently secured to the spine member 10.

FIGS. 2 and 13 show how the forward and aft skin support flanges 14, 15 are locally thickened at the outboard end adjacent to the weight receiving slot 13 and, there merging, continue thickened to the blade tip. Characteristically, however, and except for desired local variations, the skin support flanges 14, 15 will be thickened progressively inboard toward the clevis portion, where such thickness is desired for strength as well as mass and stiffness characteristics. Note from FIG. 8 that the thickening of the vertical web 12 forwardly fills the spine member 10 between the forward flanges 14 as the C-section of FIG. 7 is reached. Also, the integral spine-like member 10 is substantially thickened beyond the normal streamline contour of the airfoil in the taperingly raised upper and lower flat portions 18 and 19 which merge at the clevis part 11 into spaced apart upper and lower clevis plate-like fitting parts 21, 22. Such plate-like clevis fitting parts are of greater chordwise extent, both aft and forward, than any other part of the spine member 10. Transition is effected by (as shown in FIG. 6) firstly, a section which is solid forwardly to the farthest forward extent of the skin support flanges 14, at which the vertical web portion 12 reaches its maximum thickness; then in rounding out forwardly to provide the inboard leading edge plate attachment portion 23 as shown in FIGS. 1, 4 and 7; and thence sloping farther forward and outward from the chord plane in shoulder portions 24 which merge into the clevis plate-like fitting parts 21, 22. Through vertical bores in them, aligned fore and aft bushings 25, 26 are inserted, to receive bolts by which the assembled blade is mounted to the hub of the helicopter rotor.

The inner surface of the plate-like clevis fitting parts 21 are rounded toward each other to terminate in a rounded clevis throat wall 30. This extends aft from the juncture of the shoulder portions 24 with the clevis plate-like portions 21 to a point aft of the vertical web 12 but not the entire extent of the clevis throat part 11.

Along the spanwise outer side opposite that portion of the rounded clevis throat wall 30 aft of the web 12, a chordwise extending vertical stub wall 31 is provided as shown in FIGS. 1, 2 and 3, extending forward to the aft side of the thickened vertical web 12. Against this stub wall 31 is bolted a heavy aft structure closure fitting 32. This serves several functions, including that of anchoring the entire aft blade structure and providing a drag fitting attachment. It includes a forward extending portion 33 flanged at its foremost end to abut against the aft side of the thickened vertical web portion 12, and stepped (as shown in FIG. 3) to abut the aft edge of the stub wall 31. Its upper and lower edges are tapered outward to fit between the aft extending skin support flanges 15 and thence inward to support the upper and lower aft airfoil skins 16. Near the trailing edge of the blade, the closure fitting 32 has a spanwise outboard-extending portion 35, shown in FIG. 3, to which the upper and lower aft skins 16 are anchored by means of rivets 36. These skins do not cover the aft inboard corner of the fitting 32, which is provided with a vertically bored drag link fitting boss 39.

As shown in the cross-sections commencing with FIG. 6 and progressively outboard, the aft skins extend from the flanges 15 to an adhesive joint at their trailing edge margins 37. Forwardly of the trailing edge they are supported by honeycomb filler material 38, which continues forward between the skin flanges 15 to the aft side of the vertical web portion 12. The honeycomb filler material 38 extends from the blade tip inboard to the closure fitting 32.

The leading edge structure is even more simple than this aft structure. A curved leading edge plate 17 extends in one piece from the shoulder portion 24 to the blade tip. At its inboard end it is anchored to the solid rounded leading edge plate attachment portion 23 by leading edge pins 41. This adds mechanical security to its otherwise bonded attachment to the attachment portion 23 and, thence outboard, to the forward projecting skin support flanges 14.

At the extreme outboard end, an inertia weight 42 is secured within the weight receiving slot 13 by rivets 43 as shown in FIG. 3; and conventional local adjustable heavy slug weights 44 may be added for tracking and balance.

Of paramount value in the present integral spined construction is the ease by which alterations in dimension may be introduced to control the mass and stiffness characteristics of the blade along its entire span. Just as the characteristic increase inboard in the web portion 12 is milled to provide transition as the clevis part 11 is approached, local stepped increases in web thickness, such as those designated 20 in FIGS. 1 and 2, provide for engineering control of mass and stiffness characterstics at the outboard blade sections. These require no variation in dimension and weight of any other part, except for the very minor change in contouring of the light-weight filler material 38 along its forward edge. Similarly, control by changing the thickness of the skin flanges, in the same manner as at the slot 13 (see FIG. 2) may likewise be achieved merely by milling. This permits easy corrective design changes in a wholly practical integral spar and root-retention which, without build-ups of doublers and other separate retention parts, serves as the spine or backbone for the simple, reliable blade structure disclosed.

One of the unique advantages of the present construction is its adaptability for attachment to rotor hubs of varying designs. Thickening the spar section to solidity as the root is approached adjacent to the clevis throat part 11, permits a wide range of solutions to the hub attachment problem. Thus, such variations are possible as forming the hub itself as a clevis, to include a yoke-like part extending spanwise outward over and under, or fore and aft, of such solid clevis throat, thus taking the place of the integral plate-like fitting parts 21, 22 and the upper and lower raised portions 18, 19 which extend beyond the streamline contour of the airfoil. Likewise the direction of the axes of the bores 25, 26 which attach the present spine member to the rotor hub are not the essence of the invention, and other variations in detail will occur to those familiar with the art. Accordingly the present invention is not to be construed narrowly but rather as co-extensive with the claims hereof.

We claim:
1. Spined construction for helicopter rotor blades and the like, comprising
    an integral spar and root juncture member
        formed along the greater part of the blade span to an H-section having a vertical web portion and upper and lower skin-support flange portions projecting forward and aft thereof,
    the vertical web portion being of varying thickness along the blade span, which variation is characterized generally by an increase in thickness inboard toward the root juncture portion of said integral member,
    whereby the mass and stiffness characteristics of the blade are controlled by design variation of such web portion thickness along the blade span,
    the root juncture portion being solid throughout its entire depth and from substantially the leading edge to the aft extent of the thickened vertical web portion,
    in combination with a curved leading edge plate secured to the forward-projecting upper and lower skin-support flanges, and
    aft section structure including skins secured to the upper and lower aft-projecting skin-support flange portions.

2. The spined construction for rotor blades and the like defined in claim 1,
    wherein the root juncture portion includes integral spaced-apart upper and lower clevis plate-like fitting parts continuous with, and whose chordwise extent is at least as great as that of, the forward and aft skin-support flange portions outboard thereof, the root juncture portion of said integral member joining, supporting and spacing apart the said upper and lower clevis plate-like fitting parts in the manner of a clevis throat.

3. The spined construction for rotor blades and the like defined in claim 1,
the combination further including an aft closure rib member secured to the root juncture portion chordwise aft of the thickened web portion.

4. The spined construction for rotor blades and the like defined in claim 1,
the upper and lower skin-support flange portions of the integral spar and root juncture member being of varying thickness along the blade span, which variation is characterized generally by an increase in thickness inboard toward the root juncture portion,
whereby the mass and stiffness characteristics of the blade are controlled by design variation of such skin-support flange thickness.

5. The spined construction for rotor blades and the like defined in claim 2,
in which said clevis plate-like fitting parts have a vertical extent greater than the depth of such H-section, and
in which, at such root juncture portion outboard of and adjacent to such throat, the aft-projecting skin-support flange portions are increased in chordwise extent and in thickness, outward of the normal streamline contour of the blade,
whereby to serve as a transition between such H-section and the clevis plate-like fitting parts.

6. The spined construction for rotor blades and the like defined in claim 4,
in which, at such root juncture portion outboard of and adjacent to such throat, the aft-projecting skin-support flange portions are increased in chordwise extent and in thickness, and
in which said increase in thickness of the web portion inboard toward the root juncture portion fills between the forward-extending skin support flanges and extends solidly forward to roundness beneath the leading edge plate,
thereby providing a C-section portion which serves as a root structure transition region.

No references cited.

MARTIN P. SCHWADRON, *Primary Examiner.*

E. A. POWELL, JR., *Assistant Examiner.*